United States Patent [19]

Laletin

[11] Patent Number: 4,890,065
[45] Date of Patent: Dec. 26, 1989

[54] RELATIVE TIME DELAY CORRECTION SYSTEM UTILIZING WINDOW OF ZERO CORRECTION

[75] Inventor: William H. Laletin, Boulder, Colo.

[73] Assignee: Howe Technologies Corporation, Boulder, Colo.

[21] Appl. No.: 31,108

[22] Filed: Mar. 26, 1987

[51] Int. Cl.⁴ .................. H03K 5/22; H03K 5/00; G05F 5/00; H03G 00/00

[52] U.S. Cl. .................................. 328/155; 328/146; 328/147; 328/149; 328/127; 307/494; 307/511; 307/520; 307/363

[58] Field of Search ............... 328/155, 127, 146, 147, 328/149; 307/490, 493, 494, 511, 520, 358, 359, 363, 364, 514, 516, 527; 381/97

[56] References Cited

U.S. PATENT DOCUMENTS

| 3,588,710 | 6/1971 | Masters | 328/155 |
| 3,699,462 | 10/1972 | Kietzer et al. | 328/155 |
| 3,787,775 | 1/1974 | Lanning | 328/155 |
| 3,896,395 | 7/1975 | Cox | 328/149 |
| 4,562,312 | 12/1985 | Duttweiler | 364/824 |
| 4,567,607 | 1/1986 | Bruney et al. | 381/1 |

OTHER PUBLICATIONS

"Stereo Phase Error Detection and Automatic Phase Correction using an Audio Gross-Correlation Technique", by David A. Howe.
Instructions in user manual for Howe Audio Series 2000 Phase Chaser, Howe Audio Production, first published on or about Nov. 30, 1981.
Instructions in user manual for Howe Audio Series 2100 Phase Chaser, Howe Audio Production, first published on about May 31, 1983.
"Time Base Correction Comes to Audio", BM/E, Nov. 1985.
"Audio Time Base Correction", Broadcast Engineering, Feb. 1986.
"Real Time Stereo Phase Error Correction", Howe Audio Productions, Inc. 1/1986.
"Wideband Phase Shift Networks", by R. B. Dome, Electronics, Dec. 1946.
"ATBC Solves Carts' Phase Shift, Flutter", Radio World, Jan. 15, 1985.
"Design Ideas", EDN, Oct. 27, 1982, pp. 244, 246 and 248.

Primary Examiner—John S. Heyman
Assistant Examiner—Trong Quang Phan
Attorney, Agent, or Firm—Ralph F. Crandell; John R. Ley; Gary M. Polumbus

[57] ABSTRACT

A time delay corrector corrects the relative time delay or phase error between two signals, for example, stereo audio signals. A window of no correction is established between two threshold levels. So long as a signal representative of the relative phase error on a relatively fast integration basis does not logically exceed the thresholds which define this window, no rapid phase error or time delay correction is accomplished. The window of zero correction thereby prevents any time delay or phase error corrections which might otherwise result from the normal phase fluctuations inherent in the two correlated stereo signals, thereby preserving the stereo imaging and information content of those signals. Upon the occurrence of the need for a relatively major time delay error correction, such as that which originates with tape splices and the like, detection signals logically exceed the thresholds of the window and a phase correction is rapidly attained.

8 Claims, 4 Drawing Sheets

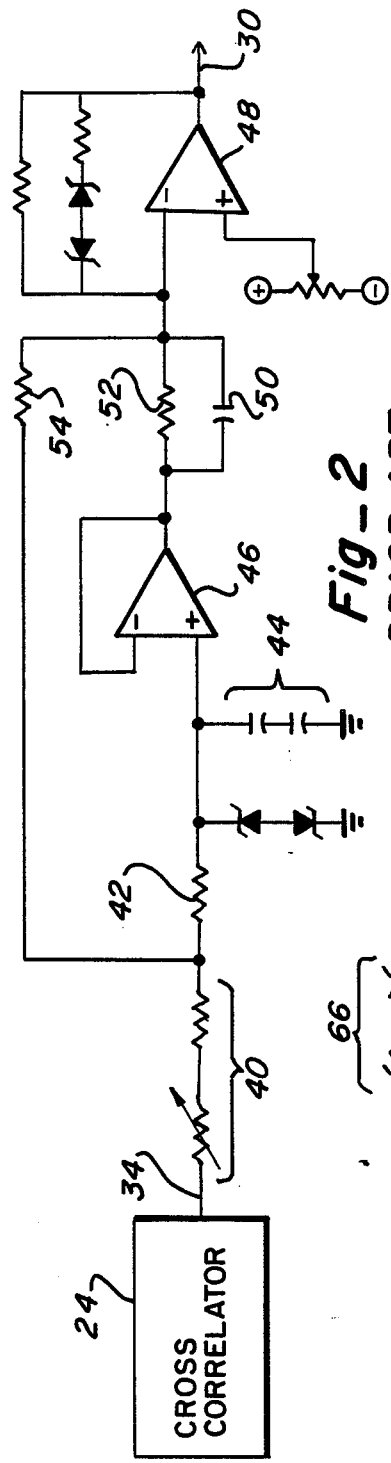
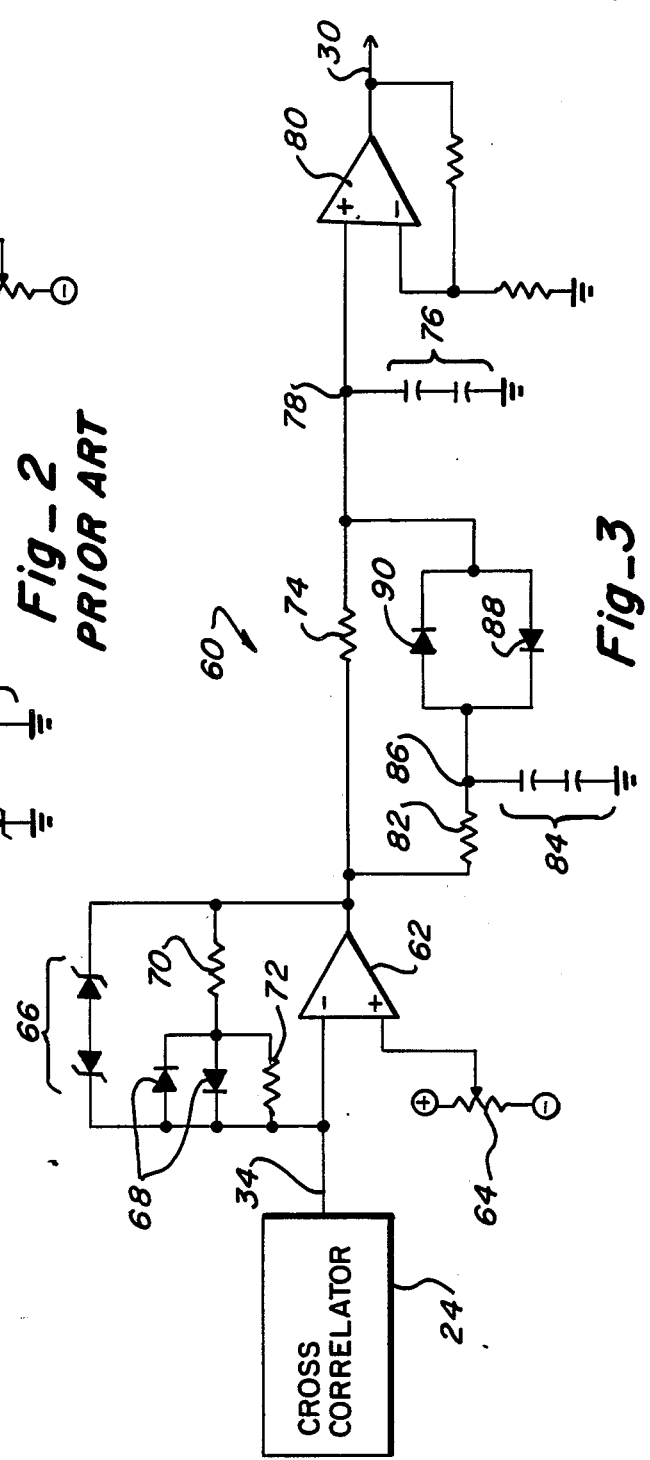

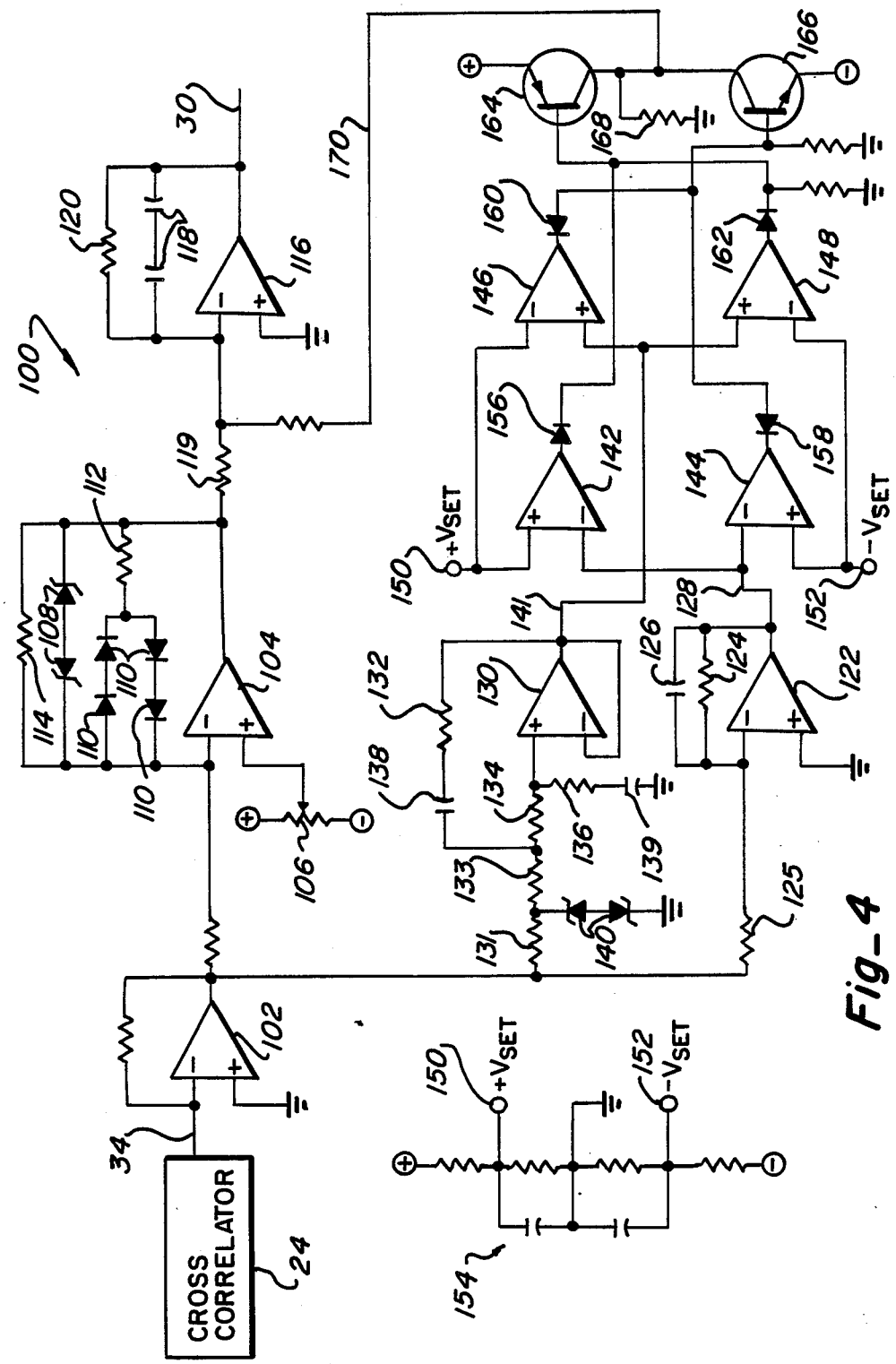
Fig_4

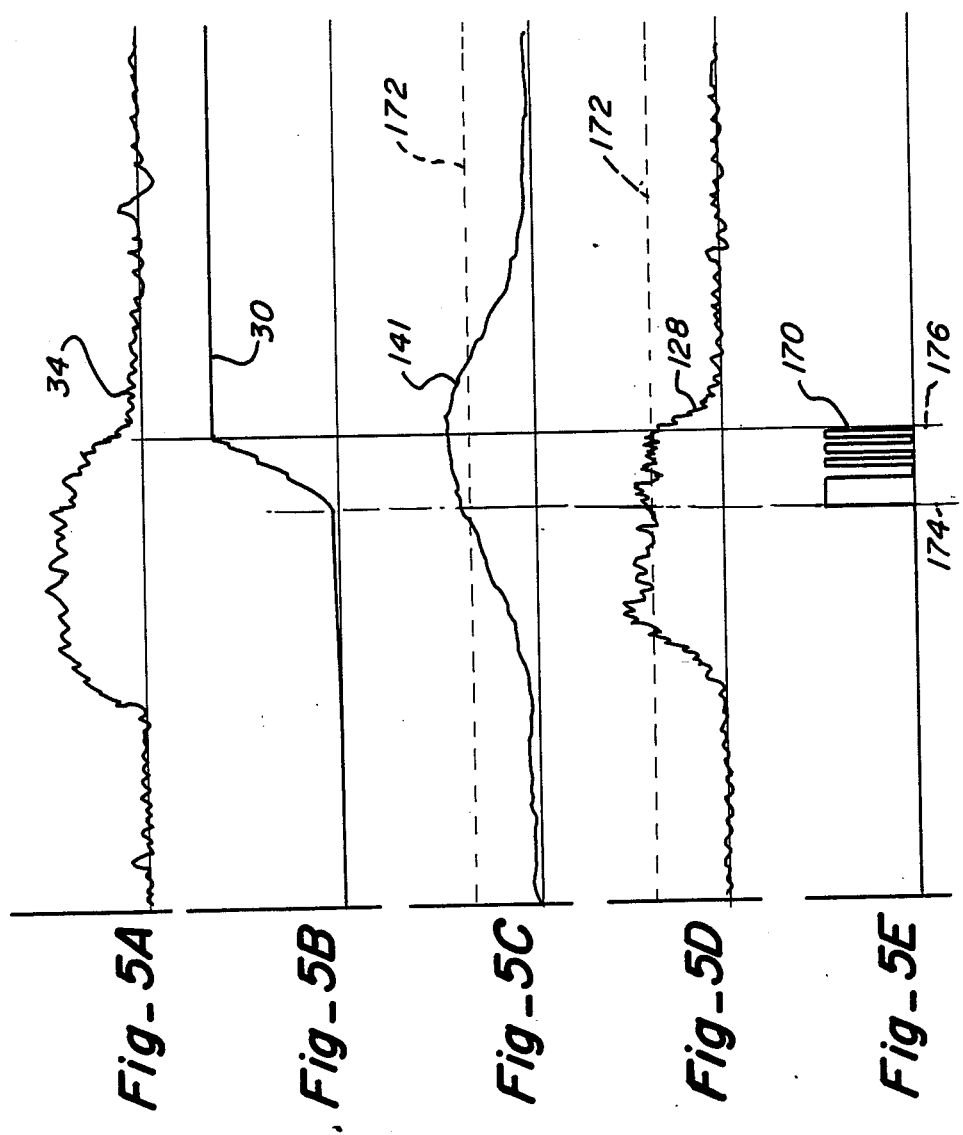

RELATIVE TIME DELAY CORRECTION SYSTEM UTILIZING WINDOW OF ZERO CORRECTION

This invention relates to automatically aligning the time relationship between two signals, for example, right and left in the case of stereo audio signals, by using only the inherent information content of the signals to detect and correct time delay or phase errors between the two signals without degrading the information content of the two signals. More particularly, the improvements available from the present invention allow very rapid correction of relatively large time delay errors while preserving the normal short duration phase fluctuations that characterize the information content of the correlated two signals, thereby preserving the intended psychoacoustic effect in the case of stereo audio signals.

BACKGROUND OF THE INVENTION

Electrically combining two phase shifted or time delayed signals, such as two stereo audio signals, for example, can create significant unwanted distortions and artifacts. A distinguishable loss or change in the high frequencies, a "whirling" effect, or even a hollowness in the medium frequencies are examples of the distortion resulting from combining the signals. Frequency cancellations occur across the spectrum (the comb filter effect), and the frequencies at which the cancellations occur become lower and more noticeable as the time delay error or phase shift increases. The effect of the frequency cancellations and other degradations is a reduction in the quality and content of the information conveyed by the two signals. In the case of a monaural audio signal formed by combining the two signals, the effect is a significantly degraded sound quality. When phase shifted stereo audio signals are combined acoustically in space, the result of the combination is a rotation of the perceived acoustical image.

The sources of relative time delay errors between separate signals or channels are numerous. Much radio broadcasting is accomplished by use of stereo tape cartridges wherein each signal is recorded on a separate magnetic track. The heads which record the tracks or which transduce signals from the tracks may be out of perpendicular alignment with the longitudinal extent of the tape (an "azimuth" error) thereby introducing time delays and phase errors. Despite the best efforts at aligning the heads, it is virtually impossible to avoid the time delay errors created by azimuth errors, due to azimuth errors in the equipment which recorded the tracks, improper insertion of the recording medium into the playback machine, and still other azimuth errors in the playback machine, for example. Differences in propagation time between the two signals also create a time delay error. Propagation time differences result as the signal is transmitted through electronic equipment which has separate signal paths for each signal. Television signals, which also include stereo audio signals, that are reflected from satellites are particularly prone to time delay errors. Stereo signals which are simultaneously transmitted as discrete left and right channels over different microwave links are subject to interchannel time delay errors due to different propagation path lengths or different transmission circuit characteristics. Other sources of time delay errors are in digital compact disc equipment, hi-fi VCRs, and multichannel cinema audio signals. Because most radio and television receivers, home video cassette machines and movie theaters are monaural, substantial signal quality degradation occurs due to the monaural summing of the two phase shifted signals.

While as a conceptual matter, correction of time delay and phase errors would appear desirable, certain counterbalancing considerations also exist. Normal stereo programming inherently incorporates normal phase fluctuations. These intentional phase fluctuations create the desired psychoacoustic effect. The phase differences or intentional time delay errors create two separate neurological inner ear sensations which have phase differences resulting from the slightly different audio path lengths (equivalent to auditory paralax). These sensations are recognized by the human brain as primary sound localization cues.

Spacial effects from the sound sources can only be humanly realized if there is some degree of correlation between the two separate signals. If the degree of correlation is increased to unity so that both channels are identical, the effect of a monaural sound source is created. Conversely, as the degree of correlation between the two channels or signals is reduced to zero, the impression of a psychoacoustic stereo image moves from a centralized location to a spacially distributed image and is ultimately replaced by the impression of two separate sounds from two separate sources. It is therefore important to maintain the intended correlated phase fluctuations inherent in stereo signals and broadcasts, but to eliminate the unintended relative time delay errors between the two separate signals to avoid degradation in the information those signals contained.

Attempts at solving the problem of unintended time delay errors have involved recording alignment pilot signals on each of the parallel tape tracks and attempting to use those alignment signals to correct for time delay errors. The disadvantage in this approach is that special equipment is required to decode the pilot signals, thereby limiting the usefulness of such a technique to those applications where the equipment is available. Another approach has been matrixing, where the sum of two signals is recorded on one track and the difference of the two signals is recorded in the other track. Matrixing simply re-introduces the same problem in another form, since time delay errors will lead to instability or degradation when decoding the matrixed information.

The most satisfactory solution to the time delay problem is that of using the program content or information contained in the two signals themselves. When properly extracted and processed, such information can be used to correct unintentional time delay errors. In pursuing a solution in this manner, however, it was recognized that it was necessary to preserve the normal phase fluctuations inherent in the correlated stereo signals. Thus, to correct for unintentional time delay errors in the two signals while preserving the normal phase fluctions, it was necessary to attempt to distinguish between these two types of time delay or phase error situations.

Some of the earlier time delay error correction systems, such as the Model 2000 and Model 2100 "Phase Chaser" manufactured by Howe Audio Productions of Boulder, Colo. 80301, both of which are prior art to the present invention, employed circuitry such as that shown in FIG. 1. A left signal and a right signal were respectively applied to the input terminals of amplifiers 12 and 14. The signals delivered from the amplifiers 12 and 14 were conducted through signal propagation control means, in the form of left and right voltage controlled time delay circuits 16 and 18, for controlling the relative time delay of the two signals which are fed to output driver amplifiers 20 and 22, respectively. The controllable time delay circuits 16 and 18 vary or control the delay or propagation time of each signal therethrough to the driver amplifiers 20 and 22, respectively. A feedback correction circuit, which comprises a cross-correlator 24 and a pair of integrators 26 and 28, delivers an error correction signal at 30 which is related to the average (i.e., integrated) relative phase difference to the two signals applied to the driver amplifiers 20 and 22. An inverting amplifier 32 alters the polarity of the correction signal at 30 to cause the left time delay circuit 16 to react oppositely in time delay or signal propagation effect compared to the right time delay circuit 18. Only one time delay circuit 16 or 18 operates at a time. The "leading" signal is delayed an amount to place it in a zero time delay relationship with the "lagging" signal. The two signals are thus brought into a non-phase shifted relationship.

More information concerning the typical prior art time base correction system shown in FIG. 1 can be found in the user's manuals published for the Models 2000 and 2100 Phase Chasers, and in a paper titled "Stereo Phase Error Detection and Automatic Phase Correction Using an Audio Cross-Correlation Technique" by David A. Howe, published in the Proceedings of the 39th Annual Broadcast Engineering Conference of the National Association of Broadcasters, Apr. 13 to 17, 1985, at pages 543 to 559.

The voltage controlled time delay circuits 16, 18 are well known in the art and are known as all pass filters. A description of one such voltage controlled time delay circuit can be found in the article by Mr. Howe referenced above. Other configurations suitable for this function include sampled input charged coupled device (CMOS bucket brigade) and standard audio digital delay line.

The cross-correlator 24 is a device whose output phase error signal at 34 is a function of the relative phase difference or error between its two input signals, i.e. those supplied at the input to the driver amplifiers 20 and 22. The phase error signal at 34 from the cross-correlator 24 represents the degree of coherence (or similarity between both real and imaginary components) existing between the two input signals. An explanation of the operation of a cross-correlator 24 can be found in the paper by Mr. Howe referenced above, and in an article "Frequency Shifter Encompasses Audio Band" by Franklin G. Fink, published in *EDN*, Oct. 27, 1982, at page 244. An explanation of the use of Wein bridge networks as 90 degree phase splitting networks, required for analog cross-correlation, can be found in "Wide Band Phase Shift Networks" by R. B. Dome, published in *Electronics*, December 1946, beginning at page 112 and in "Properties of Some Wide-Band Phase Splitting Networks: by David G. C. Luck, published in *Proceedings of the I.R.E.*, February 1949, beginning at page 147. Details of 90 degree phase splitting networks employing cascaded single pole all-pass filters can be found in "Normalized design of 90 Degree Phase Shift Networks" by S. D. Bedrosian, published in *IRE Transactions on Circuit Theory*, June 1960, beginning at page 128, and in "Cascaded active circuits yield 90-degree phase difference networks" by Raymond E. Cook, published in *EDN*, April 1973, beginning at page 52. Proper operation of the cross-correlator can be obtained by examining the frequencies in the two signals in the rand of 900 Hz to 20 kHz.

The concept behind the two integrators 26 and 28 was to attempt to correct for the unintentional relative time delay error between the two signals, while recognizing that it was desirable to preserve the intentional normal phase fluctuations inherent in the correlated stereo signals. It was presumed that the unintentional time delay behaves more like a fixed relative time delay (created by a fixed azimuth error, for example) than a relatively fast or rapidly changing time delay. Accordingly, the slow integrator 28 derived a correction signal by slowly integrating the phase error signal at 34 to correct for the unintentional generally fixed phase delay. The effect of the slowly derived correction signal from the integrator 28 was to change the relative time delay between the left and right signals by a considerable amount, up to 100 microseconds, for example. The intent of the fast integrator 26 was to adjust for relatively rapidly varying phase fluctuations such as those which occur from tape flutter and "wow" associated with tape playback machines. Unfortunately, the rapid phase fluctuations inherent in tape wow and flutter are very similar in nature to the normal phase fluctuations in correlated stereo signals. Consequently the fast integrator also had the undesirable effect of degrading or eliminating the inherent desirable phase fluctuations, thus reducing the quality of the stereo image. The degradation was continuous because the correction signals from both integrators were added together and thus both correction signals had a continuous effect.

Prior art time delay error correction systems also lacked the capability to rapidly respond to abrupt changes in the magnitude or polarity of the unintentional time delays which may have been created by a variety of sources, for example splicing new material into pre-existing material. Ultimately, the slow integrator 28 would correct for such phase changes, but only after a significant time delay of, for example, up to 15 seconds. To adjust the integration rate of the slow integrator 28 so that its correction signal was more rapidly effective also had the undesirable effect of degrading the normal phase fluctuations inherent in the correlated stereo signals. Thus to increase the integration rate and achieve faster time base correction inherently involved the degradation or reduction of the psychoacoustic stereo image. The fast integrator 26 in such prior art systems, was simply incapable of accommodating the significant major phase changes, but was only effective in achieving correction for very minor phase fluctuations. The fact that the output of the fast and the slow integrators 26 and 28 was summed together to create single correction signal at 30 resulted in the major component of the correction signal being established by the slow integrator 28.

The prior art circuitry known to have been employed in the fast and slow integrators 26 and 28 is illustrated in FIG. 2. The phase error signal at 34 from the cross-correlator 24 is applied through resistors 40 and 42 to capacitors 44. The capacitors 44 are oppositely connected polarized electrolytic capacitors, but could be any nonpolar capacitor. The positive input terminal of a voltage follower operational amplifier (op amp) 46 is connected to the junction of the resistor 42 and capacitors 44. The resistors 40 and 42, the capacitor 44 and the op amp 46 function as the slow integrator to gradually integrate the phase error signal at 34 from the cross-correlator 24 and supply an input signal to a driver op amp 48. The output signal from the op amp 48 is the control correction signal at 30. A capacitor 50, connected in parallel with a resistor 52 at the output terminal of op amp 46, allows the signal derived by the slow integrator to propagate slightly faster to the op amp 48. The function of the fast integrator is achieved by a feed forward resistor 54 which allows a small fraction of the unintegrated phase error signal 34 to reach the driver op amp 48. Directly feeding forward of a small fraction of the error signal allowed high frequency phase errors to be quickly corrected, although the resistor 54 did not, strictly speaking, achieve an integration function. In addition to compensating for the high frequency phase errors from tape wow and flutter, the feed forward resistor 54 also corrected at least a portion of the normal phase fluctuations inherent in the high frequency stereo signals, thereby degrading part of the information contained in the two signals and degrading stereo performance.

SUMMARY OF THE INVENTION

The new and improved time base correction system of the present invention employs a means for establishing threshold levels or a window of no correction wherein no adjustment of the relative phase differential or time delay is achieved, thereby preserving the normal phase fluctuations inherent in correlated stereo signals. However, once the phase error signal becomes sufficiently great, means such as integrators or comparators provide detection of signals which exceed the as integrators threshold of the window of no correction. A control error correction signal of significant proportion is produced to rapidly change the propagation time delay through the controlled time delay circuits and thereby achieve relatively major time delay error correction on a relatively rapid basis. As the proper correction is achieved, the inter-channel phase difference signal moves within the window of no correction at which time the rapid error correction process ceases. A slow integrator remains in operation to provide fine adjustments of the error correction control signal. Rapidly occurring time delay errors originating from splices and the like, for example, are quickly eliminated. The normal phase or time delay error corrections are preserved to accommodate the slowly varying time delay errors when rapid major adjustments are not required.

The actual scope of the present invention is defined by the appended claims. The invention itself can be better understood from the following detailed description of two preferred embodiments of the present invention, and from the drawings which are next briefly described.

BRIEF DESCRIPTION OF THE DRAWINGS

FIG. 2 is a schematic diagram of the prior art fast and slow integrators illustrated in FIG. 1.

FIG. 3 is a schematic diagram of a first embodiment of the present invention, to be substituted for the fast and slow integrators shown in FIG. 1.

FIG. 4 is a schematic diagram of a second embodiment of the present invention, to be substituted for the fast and slow integrators shown in FIG. 1.

FIGS. 5A, 5B, 5C, 5D and 5E are wave form diagrams illustrating the operation of the embodiment of the present invention shown in FIG. 4.

DETAILED DESCRIPTION

Figure 1:
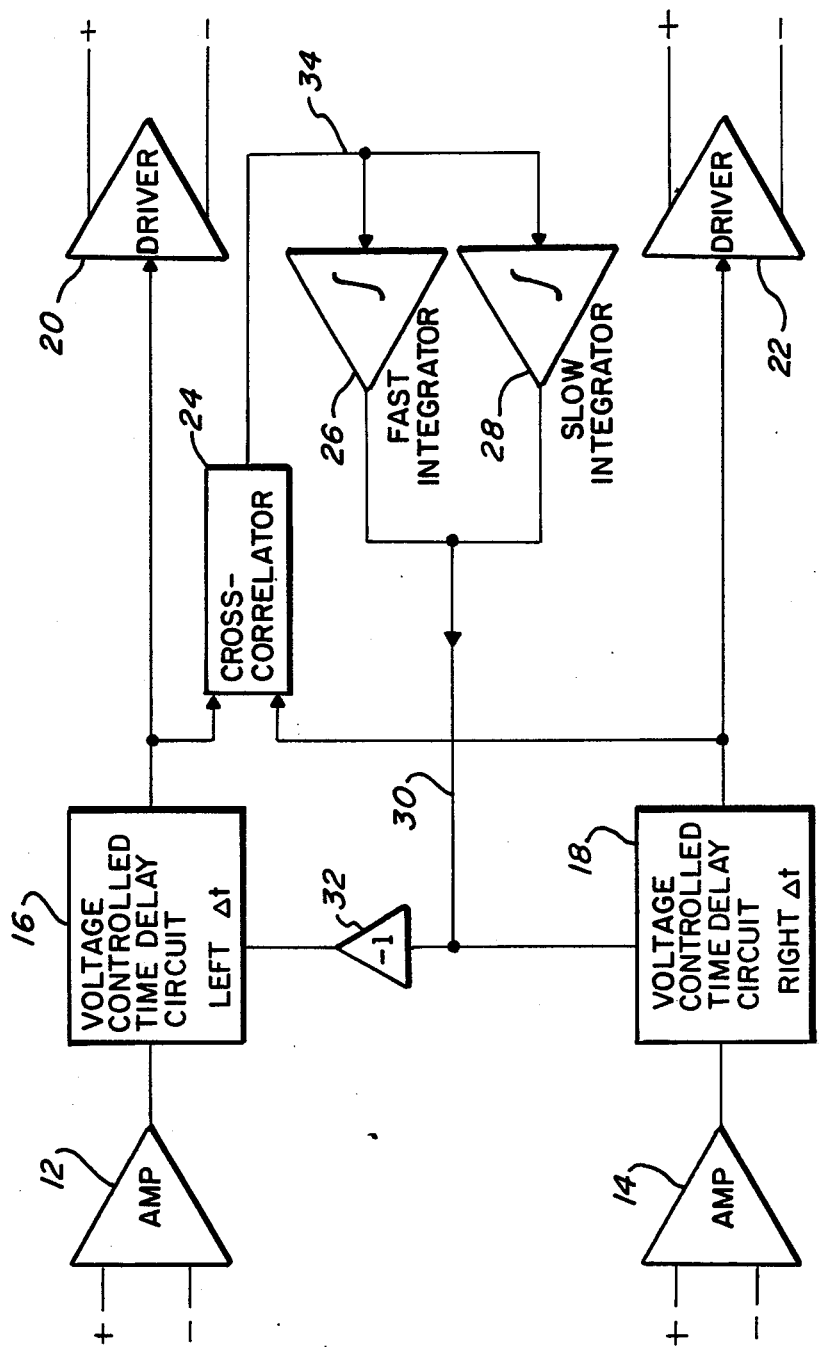
FIG. 1 is a block diagram of a typical prior art time delay error corrector to which the present invention relates and is an improvement.

A first embodiment of the present invention is referenced 60 and is illustrated in FIG. 3. The circuit embodiment 60 is intended to be connected to the cross-correlator 24 and is used for deriving the correction signal 30 (FIG. 1). Thus, the circuit 60 replaces the integrators 26 and 28 illustrated in FIG. 1.

The phase error signal at 34 from the cross-correlator 24 is amplified by applying it to the inverting input terminal of an op amp 62. A compensating voltage signal is applied to the non-inverting input terminal through a potentiometer 64 to compensate or trim the op amp 62. Back to back Zener diodes 66 connected across the op amp 62 to prevent the amplifier 62 from saturating. Oppositely-polled parallel-connected diodes 68 and associated resistors 70 and 72 also connected across the op amp 62 operatively achieve a variable gain from the op amp 62. The resistance value of resistor 72 is preferably at least three and one-half times larger than that of resistor 70. When the output terminal of the op amp 62 approximates the voltage at the inverting input, or is less than the forward voltage drop across either of the diodes 68, a very high gain for the op amp 62 is established, since the gain is proportional to the sum of the resistance values of resistors 70 and 72. However, when the voltage at the output terminal of the op amp 62 fluctuates significantly so that one of the diodes 68 becomes conductive the gain of the amplifier is established by the resistance value of resistor 70 alone, since resistor 72 is shorted by the conductive diode 68. Thus, this feedback arrangement provides a very high loop gain and thus a low phase correction distortion factor when the output and input signals of op amp 62 are approximately equal, as will be the case when the phase error signal at 34 from the cross-correlator 24 is minimal or non-existent, that is, when the two signals are, or have been, corrected in time relationship to be in phase. This variable gain feature achieves a magnified or highly amplified effect for relatively small phase errors at 34, but upon the occurrence of large phase error signals and before complete phase correction is achieved, the gain of the op amp 62 is reduced to avoid over correcting or creating an over-shoot in the time delay error correction signal at 30.

A relatively slow integrator is established by resistor 74 and capacitors 76. The detection signal created by the slow integrator is applied to the input terminal 78 of drive op amp 80. The feedback resistors associated with the op amp 80 cause it to also perform a scaling function. The detection signal at 78 established by the slow integrator creates the correction signal at 30, after amplification by the op amp 80.

A fast integrator is established by a resistor 82 and capacitors 84. The detection signal created at terminal 86 is representative of the high frequency or rapidly occurring phase or time delay errors as represented by the phase error signal at 34 from the cross-correlator 24.

Rapid changes in the phase or time delay error will thus be quickly recognized by the presence of a voltage at terminal 86. Due to the effect of the slow integrator, the voltage at terminal 78 will not change so rapidly. Thus, rapid phase or time delay errors will be represented by a voltage at terminal 86, which may exceed the voltage at terminal 78, either in the positive sense or the negative sense.

Means such as diodes 88 and 90 operatively allows either the slow response detection signal at 78 or the fast response detection signal at 86 to have the predominant effect on correcting the time delay errors. Under normal operating circumstances, the slow response detection signal at 78 will predominate and cause the normal correction of the time delay errors. However, under rapidly changing time delay or phase error conditions when the phase error signal at 34 from the cross-correlator 24 changes significantly, current from the terminal 86 is conducted through one of the diodes 88 or 90 to terminal 78, which is the current charging point of the slow integrator capacitor 76. This occurs when the detection signal voltage at terminal 86 exceeds the forward conduction voltage of the appropriate one of the diodes 88 or 90. Because the resistance value of resistor 82 is much smaller than the resistance value of resistor 74, the forward conduction condition of the diode 88 or 90 causes the voltage on capacitor 76 to alter very rapidly. The drive op amp 80 correspondingly rapidly alters the correction signal at 30 to achieve rapid time delay or phase error corrections. Thus, substantial phase errors will be immediately detected and will be rapidly corrected. As the applied correction signal reduces the magnitude of the phase error signal 30 at 34, the difference in the detection signal voltage levels between terminals 86 and 78 diminishes until the diode 88 or 90 is non-conductive. At that time, only the slow integrator (resistor 74 and capacitor 76) remains operating.

The normal phase fluctuations inherent in the correlated stereo signal will not have an effect because the amplitude of the signal at terminal 86 under those normal phase fluctuations will not be sufficient to exceed the forward conduction voltage of the diodes 88 and 90. Thus, the diodes 88 and 90 are one example of a means for establishing a window of zero correction, wherein the conduction thresholds of the window are established by the forward conduction voltages of the diodes 88 and 90. So long as the normal high frequency detection signal at 86, which represents the normal phase fluctuations in the correlated stereo signal does not exceed the thresholds of this window, there will be no high speed phase change or compensation. However, when the high frequency detection signal at 86 exceeds the threshold of the window, a relatively rapid phase change occurs, because the detection signal at terminal 86 is directly coupled to the drive op amp 80 by the conductive one of the diodes 88 or 90.

The improvement achieved by the diodes 88 and 90 in the circuit 60 shown in FIG. 3 is that there is no phase or time delay error correction for the normal phase fluctuations inherent in correlated stereo signals, but significant phase or time delay errors are immediately corrected. The stereo imaging and signal information content is preserved without the degradation which was inherent in the feed forward resistor 54 used in the prior art circuit shown in FIG. 2. By rapidly coupling the large amplitude phase error signals to the drive op amp when the average phase correction error (as detected by the fast integrator) becomes significant enough in magnitude to exceed the normal fluctuations inherent in correlated stereo signals, thereby indicating the need for a rapid phase or time delay change, a very rapid phase correction is attained. The rapid overall phase correction is a significant improvement over the prior art wherein relatively long time periods, measured in seconds, were required to achieve overall phase corrections even for rapid and almost instantaneous step-like changes in phase and time delay errors.

Although the circuit 60 of the present invention is effective in achieving relatively rapid time delay corrections, and in ignoring the normal phase fluctuations inherent in the stereo signal, one disadvantage of the circuit 60 is that it tends to over-compensate or over-shoot. When the high frequency error correction signal at terminal 86 is coupled to the drive op amp 80, more correction may be obtained than is initially necessary. Another correction in the opposite direction is therefore required to compensate for the over-shoot. Of course, the final or fine resolution of the error correction is achieved by the effect of the slow integrator. However, even with this tendency for over-compensation, the circuit 60 is substantially improved in performance than the circuits of the prior art.

Another embodiment of the present invention is illustrated at 100 in FIG. 4. The circuit 100 is intended to compensate for the potential over-shoot or over-compensation tendencies of the circuit 60 shown in FIG. 3, as well as reduce any tendency of the very slow integrator to attempt to correct the normal phase fluctuations inherent in correlated stereo signals.

The circuit 100 receives the phase error signal at 34 from the cross-correlator 24 and couples it through a buffering op amp 102. An op amp 104 is connected to a potentiometer 106, Zener diodes 108, diodes 110 and resistors 112 and 114 in an equivalent manner as op amp 62 and components 64, 66, 68, 70 and 72, respectively, are connected in the circuit 60 shown in FIG. 3. The op amp 104 thus achieves variable gain in a manner as has been previously described in conjunction with op amp 62 (FIG. 3). A slow integrator for the normal time delay correction signal at 30 is established by op amp 116 and its associated capacitors 118 and resistor 119. Thus, slowly occurring phase correction errors are detected and primarily corrected by the slow integrator of which the op amp 116 is a part. Resistor 120 provides minimal DC feedback for loop stability.

Rapidly occurring phase and time delay errors are detected and integrated by a fast integrator associated with op amp 122. Resistor 124 and 125 and capacitor 126 achieve the fast integration capability. A rapid phase error detection signal is delivered at 128 from the fast integrator.

A moderate speed two-pole low-pass filter, approximating an integrator, is achieved by op amp 130 and the resistors 131, 132, 133, 134 and 136 and the capacitors 138 and 139 associated with it. Zener diodes 140 prevent the op amp 130 from saturating. The resistors 132 and 136 have the effect of a high frequency feed forward circuit, allowing the normally low pass circuit to respond more rapidly to step input signals which occur when the phase error signal at 34 shifts rapidly due to program splices, for example. The moderate speed integrator supplies an output moderate speed phase error detection signal at 141. All of the integrators as described herein function equivalently to high gain low-pass filters.

The output signal at 128 from the op amp 122 is applied to the inverting input terminals of op amps 142 and 144. Because the signal at 128 has been inverted by op amp 122, applying it to the inverting input terminals of op amps 142 and 144 establishes the same comparative logical reference as the signal at 141. The output signal at 141 from the moderate speed integrator at the output terminal of op amp 130 is applied to the non-inverting input terminals of op amps 146 and 148. The op amps 142, 144, 146 and 148 are connected to function as comparators. A positive set voltage (+Vset) is applied at terminal 150 to the non-inverting input terminal of comparator 142 and the inverting input terminal of comparator 146. A negative set voltage (−Vset) at terminal 152 is applied to the non-inverting input terminal of comparator 144 and the inverting input terminal of comparator 148. A resistive divider network 154 establishes the levels of positive and negative voltage on the terminals 150 and 152, respectively. Diodes 156, 158, 160 and 162 are respectively connected at the output terminals of the comparators 142, 144, 146 and 148. The diodes 156 and 162 are electrically connected to the base terminal of a PNP transistor 164. The diodes 158 and 160 are electrically connected to the base terminal of a NPN transistor 166. In order for the transistor 164 to become conductive and conduct current through a resistor 168 and apply a fast-loop correction signal on the conductor at 170, the diodes 156 and 162 must be reversed biased. Similarly, the diodes 158 and 160 must be reversed biased in order for transistor 166 to conduct.

The voltages at terminals 150 and 152 establish the thresholds of the window of zero correction. When both of the detection signals at 128 and 141 from the fast and moderate integrators exceed the thresholds of the window of zero correction, op amps 142 and 148 reverse bias their output diodes 156 and 162, respectively. Transistor 164 becomes conductive and delivers a positive fast-loop correction signal on conductor 170 to the inverting input terminal of the slow integrator associated with op amp 116. This is functionally equivalent to a positive logic AND gate, in that both inputs must be "true" in a logical sense (i.e., the signals at 141 and 128 are simultaneously outside the window determined by the threshold voltages) for the output to be "true". This corresponds to having the associated transistor become conductive. Op amp 116 quickly responds and achieves a rapid change in the control correction signal at 30. A similar situation exists when the detection signals from the fast and medium speed integrators associated with op amps 122 and 130, respectively, become logically more negative that is "false" in a logical sense relative to a logical "true," than the lower threshold voltage of the window of zero correction. The op amps 144 and 146 reverse bias their output diodes 158 and 160, respectively, and the transistor 166 becomes conductive. A negative fast-loop correction signal is applied at 170, and is quickly integrated by the integrator associated with op amp 116 to achieve a relatively rapid time delay correction signal at 30.

This operation of the circuit 100 is better illustrated in FIGS. 5A, 5B, 5C, 5D and 5E. FIG. 5A illustrates an example of a phase error signal at 34 which occurs as a result of a large change in time delay error caused by tape splice or the like. FIG. 5B illustrates the control correction signal at 30 which results from the phase error signal 34. The phase error signal at 34 increases while including the normal phase fluctuations associated with the stereo signals. FIG. 5C illustrates an example of the detection signal at 141 from the moderate speed integrator, and FIG. 5D illustrates an example of the detection signal at 128 from the fast integrator. In both FIGS. 5C and 5D, the positive logical threshold of the window of zero correction established by the resistive network 154 (FIG. 4), is illustrated as 172. As soon as the detection signals at 141 and 128 from both the moderate and fast integrators exceed the logical positive window threshold at 172 at time 174, the fast-loop correction signal is generated at 170 as is illustrated in FIG. 5E. The fast-loop correction signal of FIG. 5E causes an immediate effect on the op amp 116 (FIG. 4), which substantially modifies the correction signal at 30 to change in the relative time or phase delay of the two signals. The resulting alignment in the two signals reduces the phase error signal at 34 and the detection signal at 128 from the fast integrator immediately decreases as is shown in FIG. 5D. As soon as the detection signal at 128 falls below the threshold at 172 of the window of zero correction, the fast-loop correction signal at 170 is immediately terminated, which occurs at time 176. Thus, due to the logical "AND" function described in FIG. 4 and illustrated in FIGS. 5C, 5D and 5E, the detection signals from the fast integrator and the moderator speed integrator terminate the fast-loop correction signal at 170 and the correction signal at 30 (FIG. 4) assumes a level sufficient to correct the relative phase or time delay error in the two signals, as soon as the most sensitive or responsive integrator indicates that sufficient phase correction has been achieved.

The use of the detection signal at 141 from the moderate speed integrator is important in the logical AND function because relatively minor fluctuations of the fast integrator detection signal at 128 created by the normal phase fluctuation in correlated stereo signals will be ignored even though excursions occur outside of the window described above, since detection signal from the moderate speed integrator will not have exceeded the threshold of the window of zero correction during such fluctuations.

Extremely rapid phase error correction is achieved and the correction is achieved in such a manner as to avoid substantial overshoot or ringing in the phase correction feedback system. Furthermore, the use of a very slow integrator coupled with the window of zero correction avoids any type of serious phase correction that could be caused by the normal phase fluctuations of a correlated stereo signal. By logically ANDing the fast and moderate speed error correction signals before modifying the overall correction signal, even major phase fluctuations in the normal correlated stereo signals are accommodated without phase corrections, since such normal fluctuations are of sufficiently short duration that the slow and medium speed integrators do not sufficiently respond. The circuit 100 (FIG. 4) thereby achieves all of the previously discussed advantages associated with the circuit 60 (FIG. 3) and others, but in addition provides a means for avoiding excessive over-shoot or over-compensation in the phase or time delay error correction.

Preferred embodiments of the present invention have been shown and described with a degree of particularity. It should be understood, however, that this detailed description has been made by way of preferred example. The scope of the present invention is defined by the appended claims.

The invention claimed is:

1. A time delay corrector for receiving two input signals containing a relative time delay or phase error therebetween, correcting said time delay or phase error, producing two output signals corresponding to said two input signals and feeding said two output signals to output drive amplifiers, said corrector comprising signal propagation control means for receiving said two input signals and producing two correlated output signals corresponding thereto, sensing means operatively connected to said signals propagation control means for sensing said output signal and producing a phase error signal representative of a relative phase error between said output signals, and correcting means operatively connected to said sensing means for sensing said phase error signal and producing a phase error correction signal for controlling said signal propagation control means to correct a significant phase error between said two output signals without substantially degrading the information content of said two output signals while substantially ignoring the normal relative phase fluctuations which characterize the information content of said two input signals; characterized by the improvement in said correcting means comprising first means operative to receive said phase error signal from said sensing means for producing a first detection signal characteristic of relatively short time interval phase errors, second means operative to receive said phase error signal from said sensing means for producing a second detection signal characteristic of relatively long time interval phase errors, threshold means defining a first threshold detection signal level representative of a predetermined level of short time interval phase errors and operatively connected to said first means for limiting said first means to production of a first detection signal representative of short time interval phase errors exceeding the first threshold detection signal level, and control means and operative in response to said first and second detection signals for producing a first phase error correction signal having a characteristic established primarily by th- characteristics of said first detection signal and a second phase error correction signal having a characteristic established primarily by the characteristics of said second detection signal in the absence of a first detection signal, said control means being operatively connected to said signal propagation control means whereby said second phase error correction signal causes said signal propagation control means to correct significant long time interval phase errors, and said first phase error correction signal causes said propagation control means to correct short time interval phase errors which are more significant than said predetermined level of short term phase errors.

2. A time delay corrector as defined in claim 1 wherein said improvement in said correcting means further comprises third means operative to receive said phase error signal from said sensing means for producing a third detection signal characteristic of relatively moderate time interval phase errors, said control means being operatively connected to said third means and operative in response to said first and third detection signal for producing said first phase error correction signal when only both said first detection signal and said third detection signal exceed said threshold signal level.

3. A time delay corrector as defined in claim 2 wherein said first means comprises a fast integrator which produces said first detection signal, said third means comprises a moderate speed integrator which produce said third detection signal, and said control means further comprises first comparator means operatively connected to said first means and operative in response to said first detection signal for producing a first comparator output signal when said first detection signal exceeds said threshold signal level in either a logically positive or a logically negative sense, second comparator means operatively connected to said third means and operative in response to said third detection signal for producing a second comparator output signal when said third detection signal exceeds said threshold signal level either a logically positive or a logically negative sense, and logic means operative in response to said first and second comparator output signals for producing a fast loop correction signal when said first and second comparator output signals occupy a predetermined logical relationship, said control means being operative in response to said first and third detection signals and said fast loop correction signal for producing said first phase error correction signal.

4. A time delay corrector as defined in claim 3 wherein said threshold means defines a second threshold detection signal level representative of a predetermined level of short time interval phase errors, said second threshold detection signal level being of a sense logically opposite to said first threshold detection signal level, said control means further comprises third comparator means operatively connected to said first means and operative in response to said first detection signal for producing a third comparator output signal when said first detection signal exceeds said second threshold signal level in a logical sense opposite to the sense in which said first detection signal exceeds said first threshold signal level, fourth comparator means operatively connected to said third means and operative in response to said third detection signal for producing a fourth comparator output signal when said third detections signal exceeds said second threshold signal level in a logical sense opposite to the sense in which said first detection signal exceeds said first threshold signal level, and said logic means being operative in response to said third and fourth detection signals to produce said fast loop correction signal when said third and fourth comparator output signals occupying a predetermined logical sense relationship.

5. A time delay corrector as defined in claim 4 wherein said first and third detection signals must both simultaneously logically exceed at least on of said first and second threshold signal levels before said logic means produces said fast loop correction signal.

6. A time delay corrector as defined in claim 1 wherein said threshold means comprises at least one diode having a predetermined forward conduction voltage which establishes said threshold signal level.

7. A time delay corrector as defined in claim 6 wherein said first means comprises a relatively fast integrator, said second means comprises a relatively slow integrator, said diode is electrically connected between said first and said second integrator to conduct said first correction signal when said first detection signal exceeds said second detection signal by the predetermined forward conduction voltage of said diode.

8. A time delay corrector as defined in claim 1 where the improved correcting means further comprise a variable gain amplifier for receiving and amplifying said phase error signal, said variable gain amplifier supplying an output signal to said first sand second means.

* * * * *